(12) United States Patent
Hartwig et al.

(10) Patent No.: US 10,816,797 B2
(45) Date of Patent: Oct. 27, 2020

(54) HEAD-UP DISPLAY FOR A MOTOR VEHICLE

(71) Applicant: Bayerische Motoren Werke Aktiengesellschaft, Munich (DE)

(72) Inventors: Andre Hartwig, Munich (DE); Michael Arthur Janzer, Unterschleissheim (DE); Matthias Keller, Munich (DE); Eric Reum, Puchheim (DE); Mark Riebe, Kranzberg (DE); Florian Selig, Berg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/794,351

(22) Filed: Feb. 19, 2020

(65) Prior Publication Data

US 2020/0183165 A1 Jun. 11, 2020

Related U.S. Application Data

(63) Continuation of application No. PCT/EP2018/073832, filed on Sep. 5, 2018.

(30) Foreign Application Priority Data

Sep. 19, 2017 (DE) .................. 10 2017 216 525

(51) Int. Cl.
*G02B 27/01* (2006.01)
*F21V 8/00* (2006.01)
*B60K 35/00* (2006.01)

(52) U.S. Cl.
CPC ....... *G02B 27/0149* (2013.01); *G02B 6/0023* (2013.01); *G02B 27/0101* (2013.01); *G02B 27/0179* (2013.01); *B60K 35/00* (2013.01); *B60K 2370/1529* (2019.05); *B60K 2370/29* (2019.05); *B60K 2370/334* (2019.05); *B60K 2370/67* (2019.05); *B60K 2370/771* (2019.05);
(Continued)

(58) Field of Classification Search
None
See application file for complete search history.

(56) References Cited

U.S. PATENT DOCUMENTS 5,748,346 A 5/1998 David et al.
8,749,890 B1 6/2014 Wood et al.
(Continued)

FOREIGN PATENT DOCUMENTS

| DE | 102 14 184 A1 | 10/2002 |
|---|---|---|
| DE | 11 2015 001 341 T5 | 12/2016 |
| WO | WO 2005/054929 A2 | 6/2005 |

OTHER PUBLICATIONS

International Search Report (PCT/ISA/210) issued in PCT Application No. PCT/EP2018/073832 dated Mar. 4, 2019 with English translation (10 pages).
(Continued)

*Primary Examiner* — Jerry Rahll
(74) *Attorney, Agent, or Firm* — Crowell & Moring LLP

(57) ABSTRACT

A head-up display system for a motor vehicle includes a projection unit for providing a display image; a transparent, holographic optical fiber display panel for outputting, on a display surface, a display image that is coupled into the display panel via a coupling-in region; and a guide device designed to move the display panel between an operational position and a parked position.

13 Claims, 3 Drawing Sheets

(52) U.S. Cl.
CPC .. *B60K 2370/785* (2019.05); *B60K 2370/816* (2019.05); *G02B 6/0026* (2013.01); *G02B 27/0103* (2013.01); *G02B 2027/0123* (2013.01); *G02B 2027/0154* (2013.01)

(56) References Cited

U.S. PATENT DOCUMENTS

| | | |
|---|---|---|
| 2002/0141077 A1 | 10/2002 | Nakamura et al. |
| 2011/0242668 A1 | 10/2011 | Potakowskyj et al. |
| 2016/0124223 A1 | 5/2016 | Shinbo et al. |
| 2017/0023177 A1 | 1/2017 | Yomogita |

OTHER PUBLICATIONS

German-language Written Opinion (PCT/ISA/237) issued in PCT Application No. PCT/EP2018/073832 dated Mar. 4, 2019 (nine (9) pages).
German-language Search Report issued in counterpart German Application No. 10 2017 216 525.1 dated Jun. 14, 2018 with partial English translation (15 pages).

HEAD-UP DISPLAY FOR A MOTOR VEHICLE

CROSS REFERENCE TO RELATED APPLICATIONS

This application is a continuation of PCT International Application No. PCT/EP2018/073832, filed Sep. 5, 2018, which claims priority under 35 U.S.C. § 119 from German Patent Application No. 10 2017 216 525.1, filed Sep. 19, 2017, the entire disclosures of which are herein expressly incorporated by reference.

BACKGROUND AND SUMMARY OF THE INVENTION

The invention relates to motor vehicles having head-up displays, in particular features for arranging a display surface within the field of view of a driver of the motor vehicle.

Conventional head-up displays are currently provided with a reflective display surface via which the display image is reflected into the eye region of the driver by way of a projection device in the instrument panel. The projection device comprises for example an LED-backlit display unit, for example in the form of an LCD display unit, providing the display image that is to be imaged. Using a focusing optical unit, the display image is directed via the display surface in the direction of the driver in the form of a slightly diverging bundle of rays, and so the driver perceives a virtual display image on the opposite side of the display surface.

The display surface typically makes up only a relatively small portion of the field of view of the driver for representing essential vehicle and driving information. For realizing head-up displays for representing local or contact-analogous augmented-reality contents, it is necessary to significantly enlarge the display surface in the field of view of the driver. The projection devices necessary herefor, however, have large structural sizes that can be integrated in the instrument panel only with increased construction complexity. Moreover, the functions of the surrounding components can be significantly impaired owing to the limited installation space.

It is the object of the present invention to provide an improved head-up display for a motor vehicle that can be adapted to the driver's requirements in an improved fashion and requires installation space that is as small as possible.

This object is achieved by way of the head-up display for a motor vehicle according to the claimed invention.

According to a first aspect of the invention, a head-up display system for a motor vehicle comprises: a projection unit for providing a display image; a transparent holographic light-guide display panel for outputting the display image, which is coupled into the display panel via an input coupling region, on a display surface; and a guide device, which is configured to move the display panel between a use position and a parked position.

According to a further aspect, a motor vehicle having the aforementioned head-up display system is provided, wherein the display panel in the use position is located in front of a windshield in the case of a conventional viewing direction of a driver of the motor vehicle. The result is that a display image represented on the display surface is perceived by the driver as being superposed on the real environment, wherein the display panel in the parked position is located outside the viewing direction of the driver.

In one embodiment for the aforementioned head-up display, the latter is provided with a transparent display panel equipped with a holographic optical waveguide system. The transparent display panel can be adjusted in terms of its position using a guide device so as to adjust the representation of a head-up display image to the driver's requirements. In a use position, the display panel is arranged in the horizontal direction, that is to say in the usual viewing direction of the driver between the windshield and the eye region of the driver, and is appropriately held by the guide device such that a representation of display contents on the display panel is perceived by the driver as superposing the real environment that is perceivable in the viewing direction. Furthermore, the display panel can be removed entirely out of the field of view of the driver by moving it into a parked position.

A projection unit that is coupled to the display panel or is able to be coupled to the display panel in the use position serves for coupling a display image into the display panel and is generally formed separately from the display panel. For arrangement in the display panel in the field of view of the driver, the adjustment device allows the display panel to be arranged in a use position in the viewing direction of the driver and to be arranged in a parked position outside the viewing direction of the driver when it is not used.

A projection unit serves for coupling a display image into the display panel. Such a projection unit is generally formed to be separate from the display panel and is arranged such that a display image can be coupled in substantially perpendicular to the display panel.

The guide device can furthermore have one or two guide rails in which guide elements, which are connected to the display panel, are guided in a sliding manner.

Provision can be made for a projection unit for coupling the display image into the display panel to be held displaceably together with the display panel.

In particular, the projection unit can be connected to the guide device.

According to one embodiment, the display panel can have a lamella structure, in particular in a lamella film, having lamellas, wherein the lamellas are aligned to absorb ambient light.

The guide device can furthermore have a first guide rail, arranged in the region of the driver-side A pillar, and a second guide rail, arranged in front of a center region of the windshield of the motor vehicle.

Provision may be made for the display panel in the parked position to be situated in or under a roof and to extend parallel to the roof.

The display panel can be beveled on its outer edges, wherein the bevel extends in the viewing direction of the driver.

The display panel can furthermore comprise an input grating for coupling the display image in and for directing the display image onto a deflection grating, the deflection grating for directing the display image onto an output grating, and the output grating for coupling the display image out of the display panel, with the deflection grating being arranged between the output grating and an instrument panel of the motor vehicle.

According to an embodiment, the display panel in the use position can be inclined, with respect to the vertical direction of the windshield, toward the driver such that the surface normal of the display panel and the viewing direction of the driver enclose an angle of no more than 50°, in particular no more than 30°, preferably no more than 20°.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
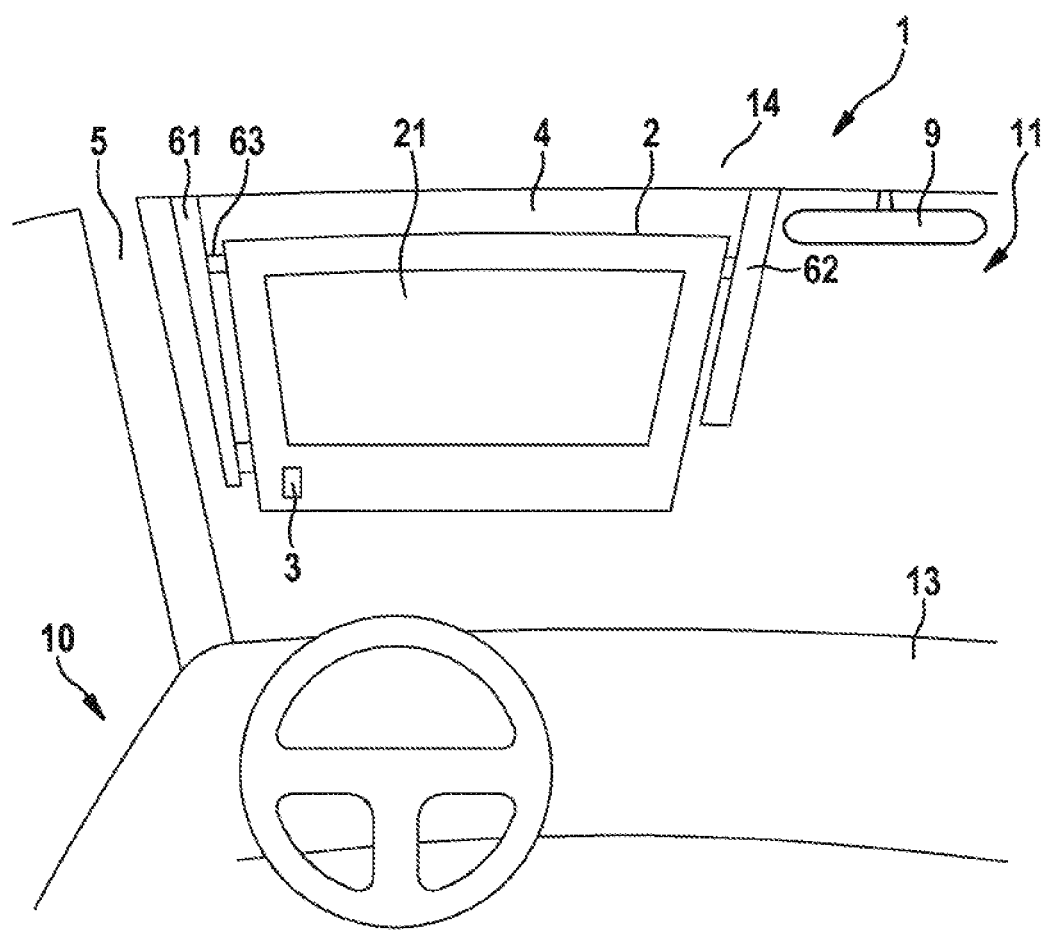
FIG. 1 is a schematic illustration of an arrangement of a holographic light-guide display panel in the field of view of a driver of a motor vehicle in a use position.
Figure 2:
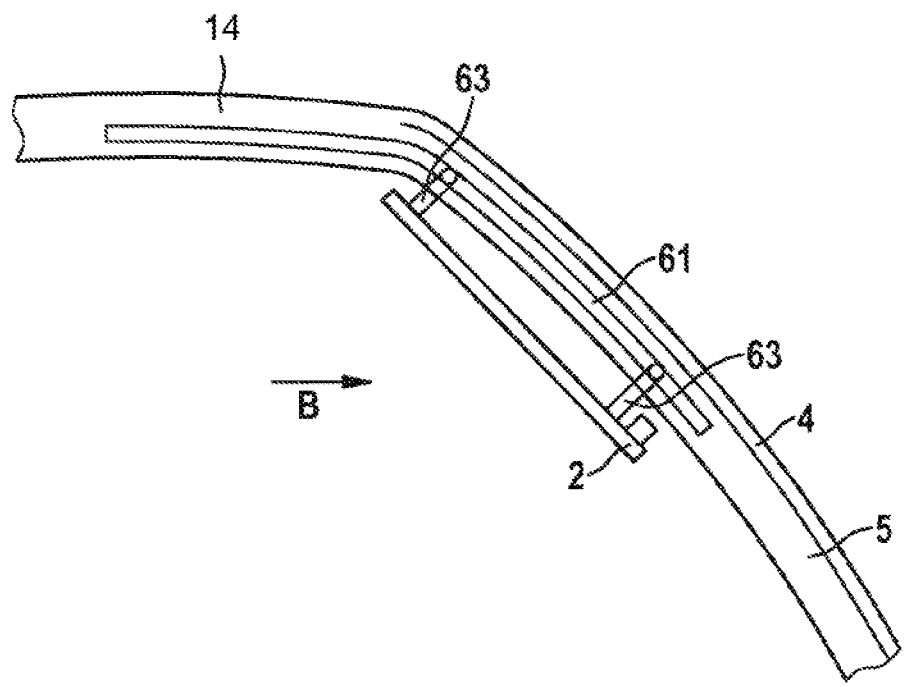
FIG. 2 is a schematic illustration of the setup of a holographic light-guide display panel in a cross-sectional view in the use position.

FIGS. 1 and 2 show a plan view and a side view of a head-up display system 1 in an interior 11 of a motor vehicle 10. The display system 1 has a holographic light-guide display panel 2, which is coupled to a projection unit 3 such that a display image transmitted by the projection unit 3 is coupled into the display panel 2 and is displayed on a corresponding display surface 21 so that it is superposed on the perception of the vehicle environment.

The display panel 2 can be arranged, as is shown in FIG. 1 and FIG. 2, in a use position in a field of view of the driver in front of an upper part of a windshield 4 of the motor vehicle 10 such that the driver perceives the existing vehicle environment through the transparent display panel 2 when looking in a straight-ahead viewing direction B that is determined by the seating position. The windshield 4 is arranged between two lateral A pillars 5, an instrument panel 13, and a roof 14.

Figure 3:
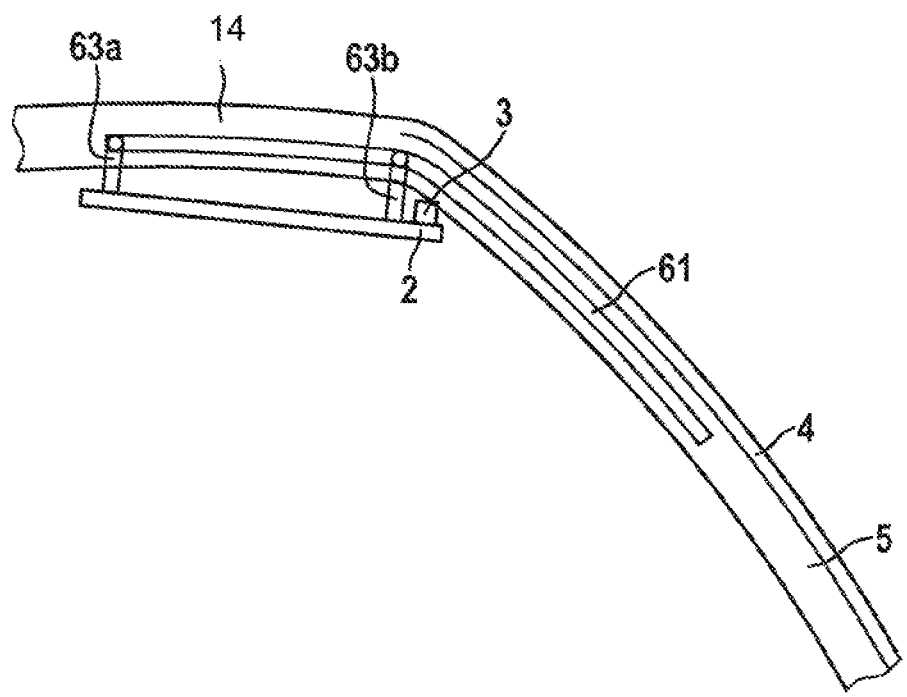
FIG. 3 is a side view of the arrangement of the holographic display panel in the interior of a motor vehicle in a parked position.

In a parked position, as is shown in FIG. 3, the display panel 2 has been removed from the field of view of the driver and is arranged such that the field of view of the driver through the windshield 4 is not restricted.

The display panel 2 is held in front of the windshield 4 via the adjustment device 6. To this end, the adjustment device 6, as a guide device, can have two guide rails 61, 62, between which the display panel 2 is held. A first one 61 of the guide rails is arranged in the region of an A pillar of the motor vehicle 10 or is integrated therein and extends along the A pillar 5 and may extend into the roof 14. The first guide rail 61 can have a curved design so as to follow a smooth transition between the horizontal orientation of the roof 14 and the inclined orientation of the A pillar 5.

A second one 62 of the guide rails can be arranged in front of a center region of the windshield 4. The second guide rail 62 can extend for example from the roof 14 or from the rear-view mirror 9 in front of an upper region of the windshield 4.

The display panel 2 is provided with guide elements 63 that are in engagement with the guide rails 61, 62 so as to be displaced along the guide rails 61, 62 in a sliding manner. The guide rails 61, 62 can each have, for example, a U-shaped profile. The guide elements 63 can then correspondingly have pins or bolts that extend into the guide rails 61, 62 and are held there in a displaceable manner.

In the present exemplary embodiment, a first and a second guide element 63a, 63b are provided at one peripheral end of the display panel 2 and retained in the first guide rail 61. The first and second guide elements 63a, 63b are preferably arranged near the upper corner and near the lower corner of the display panel 2, respectively. A third guide element 63c is arranged on a peripheral end of the display panel 2 that is opposite to the former in the horizontal direction, opposite the first guide element 63a, and is displaceable in, and is in engagement with, the second guide rail 62.

For example, the second guide rail 62, in which the third guide element 63c, which is embodied as a pin or bolt, engages, can likewise be U-shaped. Alternative refinements and guides of the third guide element 63c are likewise possible.

In the use position, the guide rails 61, 62 and the guide elements 63a, 63b, 63c allow the display panel 2 to be oriented, with respect to the windshield 4, parallel to the profile of the windshield 4 or to be inclined, with respect to the vertical direction of the windshield 4, toward the driver, with the result that the surface normal of the display panel 2 and the viewing direction of the driver enclose an angle of no more than 20°.

The projection unit 3 requires coupling of a display image into an input coupling region of the display panel 2. Provision can therefore be made for the projection unit 3 to likewise be arranged to be displaceable by one of the guide rails 61, 62 or to be displaceable separately therefrom. In particular, the projection device 3 can be fixedly connected to the display panel 2 and be connected for example to one of the guide elements 63, in particular the second guide element 63b if the input coupling region of the projection unit 3 is located in the region of the lower corner of the display panel 2 facing the A pillar. In this way, the projection unit 3 can be displaced together with the display panel 2 between the parked and the use positions.

Figure 4:
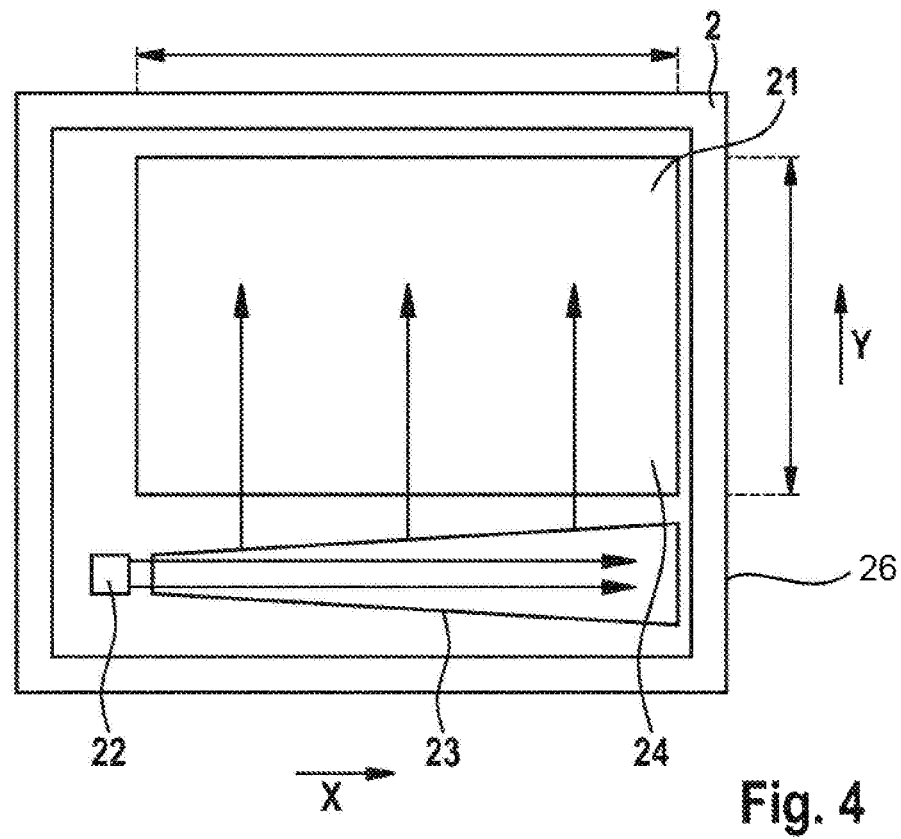
FIG. 4 is a detailed illustration of the display panel.

FIG. 4 shows a schematic illustration of a display panel 2 in more detail. The display panel 2 has a transparent design and comprises an input grating 22, which is defined as the input coupling region and via which the display image is coupled from the projection unit 3 into the display panel. The display image is preferably coupled in perpendicular to the surface direction of the display panel 2. Alternatively thereto, it can also be coupled in at an angle that deviates therefrom, wherein the direction of the input coupling also corresponds to the direction of the output coupling of the display image from the display surface 21.

The input grating 22 is configured to deflect the bundle of rays that is transmitted by the projection unit 3 and represents the display image in a manner such that the coupled-in light undergoes total internal reflection at the nearest glass-air interface of the display panel 2 and is steered in the surface direction through the display panel 2 in the direction of the deflection grating 23. The input grating 22 comprises for example a rectangular input coupling surface having dimensions of, for example, between 10×10 mm and 20×20 mm for accommodating the display image that is to be coupled in. The propagation direction of the light is deflected by way of the deflection grating 23 in the direction of an output grating 24 that is arranged in the region of the display surface 21. Since with each interaction of the light beam with the deflection grating 23 only some of the light beam is deflected, the light is distributed over the entire length of the deflection grating 23 within the display panel 2.

The output grating 24 then steers the light back into the original direction of the display image, such that it is coupled out of the display panel 2 at the original angle of incidence at which the display image is coupled into the display panel 2. The bundle of rays of the display image, which has already been distributed over the x-dimension by way of the deflection grating 23, is additionally distributed in the y-dimension via the output grating 24. The bundle of rays coupled into the display panel 2 is thereby distributed in the entire xy-dimension via the output grating 24. The size of the output grating 24 here corresponds to the dimensions required for the desired image size. If the driver of the motor vehicle 10 is looking onto the output grating 24 in the display panel 2, they will see the display image as a virtual image.

In particular, the optical system is designed such that the display image, i.e. the beam of rays representing the display image, appears to be floating at an infinite distance.

Since the holographic grating structures in the display panel 2 are functional only for a specific wavelength range, the display of a multicolor or full-color image requires that a plurality of layers of such display panels 2 are arranged one above the other. These are then combined to form a display panel composite.

The arrangement of the input grating 22 near the mounting by way of the second guide element 63b at the bottom left from the driver's view (left-hand drive) and a deflection grating 23 that extends along the lower edge of the display panel 2 or along the lower edge of the output grating 24 is advantageous. The configuration of the output grating 24, which is designed on the basis of the arrangement of the deflection grating 23, is designed for reflecting light coming substantially from the direction of the deflection grating 23, with the result that light from external light sources that is incident on the output grating typically from directions that are clearly different therefrom is not deflected in the direction of the driver.

In particular, incident sunlight can cause disturbing reflections that are extremely bright. With the selected arrangement of the deflection grating below the output grating 24 with a corresponding alignment of the output grating 24 with the deflection grating 23, only light that is incident on the display panel 2 approximately from the direction of the instrument panel will be potentially steered in the direction of the driver. As a result, direct reflections of the sun or of other external light sources are ruled out. The intensity of the light that is incident on the display panel 2 from the instrument panel 13 and can be deflected by the output grating 24 in the driver's direction, by contrast, is lower by some orders of magnitude.

The outer edges 26 of the display panel 2 can be beveled such that the edges are located, if possible, along the sightline of the driver and can thus not really be perceived as disturbing visible edges.

The display system 1 can be combined with a conventional head-up display system. The projection light of a conventional head-up display system, in which the display image is projected onto a reflective display region of the windshield 4, is here ideally not negatively affected by the transparent display panel 2. In particular, it is advantageous that the visual beam of the conventional head-up display system is completely covered by the display panel 2, i.e. that the display image of the conventional head-up display system extends through the transparent display panel 2. What is advantageous in such an arrangement is that the conventional head-up display system represents the virtual image approximately 2 to 3 m in front of the windshield 4 and can in that case be preferably used for conventional non-augmented-reality functions, such as status displays of the motor vehicle 10, for example speed, navigation displays, traffic information, and the like.

The holographic light-guide display system 1, by contrast, can represent the virtual image at a quasi infinite projection distance and can thus inject augmented-reality information, which is represented contact-analogously to objects of the vehicle environment, into the vehicle environment that is perceived by the driver.

In particular, the display panel 2 can have a removable design so as to allow cleaning of the display panel 2 on the driver-remote side of the windshield portion that is located therebehind.

On account of the above-described holographic light-guide display system, no installation space is required in the instrument panel. Furthermore, it is possible with the arrangements shown in the depiction to achieve image sizes that cover 25°×5° of the field of view of the driver, which makes possible complete covering of adjacent driving lanes with an augmented-reality head-up display image.

The guide devices made up of guide rails 61, 62 and guide element 63a, 63b, 63c make possible a positioning of the display panel 2 in the use position, wherein an adaptation to the driver height is also possible by substantially vertically displacing the display panel 2. By pushing the display panel 2 completely to the top, it is possible to displace the display panel 2 into a parked position, which can be located for example by way of an arrangement below the roof 14 or above a sun visor. Alternatively thereto, accommodation in a lining of the roof 14 can be provided.

Figure 5:
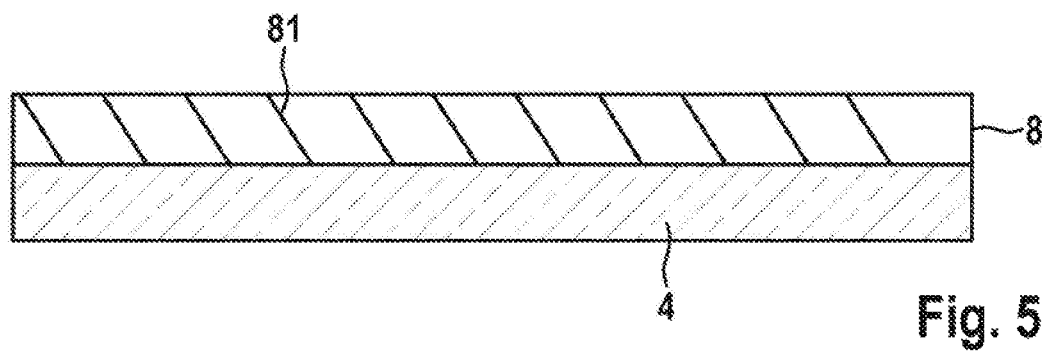
FIG. 5 is an illustration of the setup of the display panel having a lamella structure.

To further protect against reflections due to incoming sunlight, a lamella film 8, as is illustrated in FIG. 5, can be applied on the side of the display panel 2 that faces away from the driver. The lamella film 8 has lamellas 81 extending in a surface direction that extend in the direction of the surface normal and are inclined with respect thereto. The angle of inclination determines lamella surfaces that serve for shading the sun's radiation and at the same time define a preferential direction for the transmission of light. By orienting the lamellas 81 substantially parallel to the viewing direction, sunlight that is incident from above can be absorbed at the lamellas 81, while light that is incident from a direction in front of the motor vehicle 10 is transmitted for perceiving the vehicle environment. In this way, it is possible to provide in an advantageous manner, by combining a lamella film 8 on the display panel 2, a head-up display system 1 that is insensitive to the radiation of incoming sunlight.

LIST OF REFERENCE SIGNS 1 head-up display system
2 holographic light-guide display panel
21 display surface
22 input grating
23 deflection grating
24 output grating
26 outer edges
3 projection unit
4 windshield
5 A pillar
6 adjustment device
61, 62 guide rails
63a, 63b, 63c guide elements
8 lamella film
81 lamellas
9 vehicle rear-view mirror
10 motor vehicle 11 interior
13 instrument panel
14 roof The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A head-up display system for a motor vehicle, comprising:
  a projection unit for providing a display image;
  a transparent holographic light-guide display panel for outputting a display image, which display image is coupled into the display panel via an input coupling region, on a display surface; and
  a guide device configured to move the display panel between a use position and a parked position, wherein
    the display panel in the use position is located in front of a windshield in a case of a conventional viewing direction of a driver of the motor vehicle such that a superposing a real environment,
    the display panel in the parked position is located outside the conventional viewing direction of the driver, and
    the guide device has a first guide rail, arranged in the region of a driver-side A pillar of the motor vehicle, and a second guide rail, arranged in front of a center region of the windshield of the motor vehicle.

2. A head-up display system for a motor vehicle, comprising:
  a projection unit for providing a display image;
  a transparent holographic light-guide display panel for outputting a display image, which display image is coupled into the display panel via an input coupling region, on a display surface; and
  a guide device configured to move the display panel between a use position and a parked position, wherein
    the guide device has one or two guide rails, in which guide elements, which are connected to the display panel, are guided in a sliding manner.

3. The head-up display system according to claim 2, wherein
  the projection unit for coupling the display image into the display panel is held displaceably together with the display panel.

4. The head-up display system according to claim 3, wherein
  the projection unit is connected to the guide device.

5. The head-up display system according to claim 2, wherein
  the display panel has a lamella structure with lamellas, wherein the lamellas are oriented to absorb ambient light.

6. The head-up display system according to claim 5, wherein
  the lamella structure is a lamella film.

7. A motor vehicle, comprising:
  a head-up display system according to claim 2, wherein
    the display panel in the use position is located in front of a windshield in a case of a conventional viewing direction of a driver of the motor vehicle such that a display image represented on the display surface is perceivable by the driver as superposing a real environment, and
    the display panel in the parked position is located outside the conventional viewing direction of the driver.

8. The motor vehicle according to claim 7, wherein
  the display panel comprises:
    an input grating, a deflection grating and an output grating, wherein
    the input grating couples the display image in and directs the display image onto the deflection grating,
    the deflection grating directs the display image onto the output grating, and
    the output grating couples the display image out of the display panel, with the deflection grating being arranged between the output grating and an instrument panel of the motor vehicle.

9. The motor vehicle according to claim 7, wherein
  the display panel is located in the parked position in or under a roof and extends parallel to the roof.

10. The motor vehicle according to claim 7, wherein
  the display panel in the use position is inclined with respect to the vertical direction of the windshield toward the driver such that a surface normal of the display panel and the viewing direction of the driver enclose an angle of no more than 50°.

11. The motor vehicle according to claim 10, wherein
  the angle is no more than 30°.

12. The motor vehicle according to claim 10, wherein
  the angle is no more than 20°.

13. A head-up display system for a motor vehicle, comprising:
  a projection unit for providing a display image;
  a transparent holographic light-guide display panel for outputting a display image, which display image is coupled into the display panel via an input coupling region, on a display surface; and
  a guide device configured to move the display panel between a use position and a parked position, wherein
    the display panel in the use position is located in front of a windshield in a case of a conventional viewing direction of a driver of the motor vehicle such that a display image represented on the display surface is perceivable by the driver as superposing a real environment,
    the display panel in the parked position is located outside the conventional viewing direction of the driver, and
    the display panel is beveled at outer edges thereof such that the bevel extends in the viewing direction of the driver.

* * * * *